(12) United States Patent
Tanie et al.

(10) Patent No.: US 11,125,665 B2
(45) Date of Patent: Sep. 21, 2021

(54) TEST JIG AND TEST METHOD

(71) Applicant: Hitachi, Ltd., Tokyo (JP)

(72) Inventors: Hisashi Tanie, Tokyo (JP); Makoto Kitano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 16/465,714

(22) PCT Filed: Dec. 21, 2017

(86) PCT No.: PCT/JP2017/045872
§ 371 (c)(1),
(2) Date: May 31, 2019

(87) PCT Pub. No.: WO2018/131418
PCT Pub. Date: Jul. 19, 2018

(65) Prior Publication Data
US 2019/0293534 A1   Sep. 26, 2019

(30) Foreign Application Priority Data

Jan. 13, 2017   (JP) .............................. JP2017-003775

(51) Int. Cl.
*G01N 3/04*   (2006.01)
*G01N 3/20*   (2006.01)
*G01N 3/34*   (2006.01)

(52) U.S. Cl.
CPC ................ *G01N 3/04* (2013.01); *G01N 3/20* (2013.01); *G01N 3/34* (2013.01)

(58) Field of Classification Search
CPC .............. G01N 3/04; G01N 3/20; G01N 3/34
See application file for complete search history.

(56) References Cited

U.S. PATENT DOCUMENTS 6,343,515 B1   2/2002 Dodson
2008/0241552 A1   10/2008 Chiwata et al.
(Continued)

FOREIGN PATENT DOCUMENTS

CN   201828468 U   5/2011
CN   103308397 A   9/2013
(Continued)

OTHER PUBLICATIONS

International Search Report (PCT/ISA/210) issued in PCT Application No. PCT/JP2017/045872 dated Feb. 27, 2018 with English translation (five (5) pages).
(Continued)

*Primary Examiner* — Jamel E Williams
(74) *Attorney, Agent, or Firm* — Crowell & Moring LLP

(57) ABSTRACT

Some materials desired to acquire mechanical characteristics and fatigue characteristics are difficult to make in a large-size bulk material for a test piece. The invention provides a test jig which includes a primary jig which fixes both sides of a test piece, which is a test object, an upper jig which includes a load portion to load a weight on two places of an upper surface and two places of a lower surface of the primary jig, and a lower jig which includes a load portion to load a weight on two places of the upper surface and two places of the lower surface of the primary jig. The upper surface and the lower surface of the primary jig disposed on both sides of the test piece are on almost the same flat surface.

7 Claims, 18 Drawing Sheets

(56) References Cited

U.S. PATENT DOCUMENTS

| | | | |
|---|---|---|---|
| 2013/0042697 A1* | 2/2013 | Edelman | G01N 3/08 73/818 |
| 2013/0205911 A1* | 8/2013 | Wang | G01N 3/34 73/812 |

FOREIGN PATENT DOCUMENTS

| | | |
|---|---|---|
| CN | 103433336 A | 12/2013 |
| CN | 205749166 U | 11/2016 |
| DE | 103 29 012 B4 | 9/2014 |
| GB | 2 324 876 A | 11/1998 |
| JP | 59-128552 U | 8/1984 |
| JP | 2000-97833 A | 4/2000 |
| JP | 2000-131206 A | 5/2000 |
| JP | 2001-522459 A | 11/2001 |
| JP | 2009-119528 A | 6/2009 |
| JP | 2013-36878 A | 2/2013 |
| JP | 2014-85273 A | 5/2014 |
| JP | 2018155542 A * | 10/2018 |
| JP | 2018179591 A * | 11/2018 |
| WO | WO 98/49534 A1 | 11/1998 |

OTHER PUBLICATIONS

Japanese-language Written Opinion (PCT/ISA/237) issued in PCT Application No. PCT/JP2017/045872 dated Feb. 27, 2018 (six (6) pages).

Kojo et al., "Basic Studies on the Testing Method of Flexural Bond Strength," Japan Society for Adhesive Dentistry, 1990, pp. 179-200, vol. 8, No. 3 (22 pages; first three pages are concise explanation of relevance, with reference following).

Chinese-language Office Action issued in Chinese Application No. 201780077947.4 dated Apr. 21, 2021 (eight (8) pages).

English translation of document B2 (JP 2014-85273 A filed on May 31, 2019) nine (9) pages).

* cited by examiner

CROSS-SECTIONAL VIEW
A-A

CROSS-SECTIONAL VIEW
A-A

CROSS-SECTIONAL VIEW
A-A

CROSS-SECTIONAL VIEW
A-A

CROSS-SECTIONAL VIEW A-A

CROSS-SECTIONAL VIEW
A-A

STRAIN GAUGE INSTALLATION POSITION:
UPPER OR LOWER SURFACE OF ALMOST CENTER
BETWEEN END OF BONDING LAYER 42 AND END OF PRIMARY JIG 3

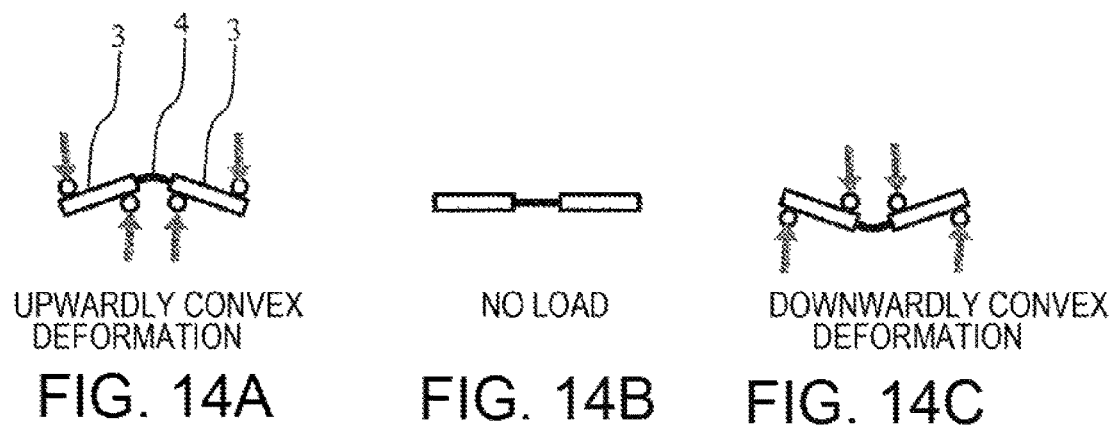
UPWARDLY CONVEX DEFORMATION
FIG. 14A
NO LOAD
FIG. 14B
DOWNWARDLY CONVEX DEFORMATION
FIG. 14C
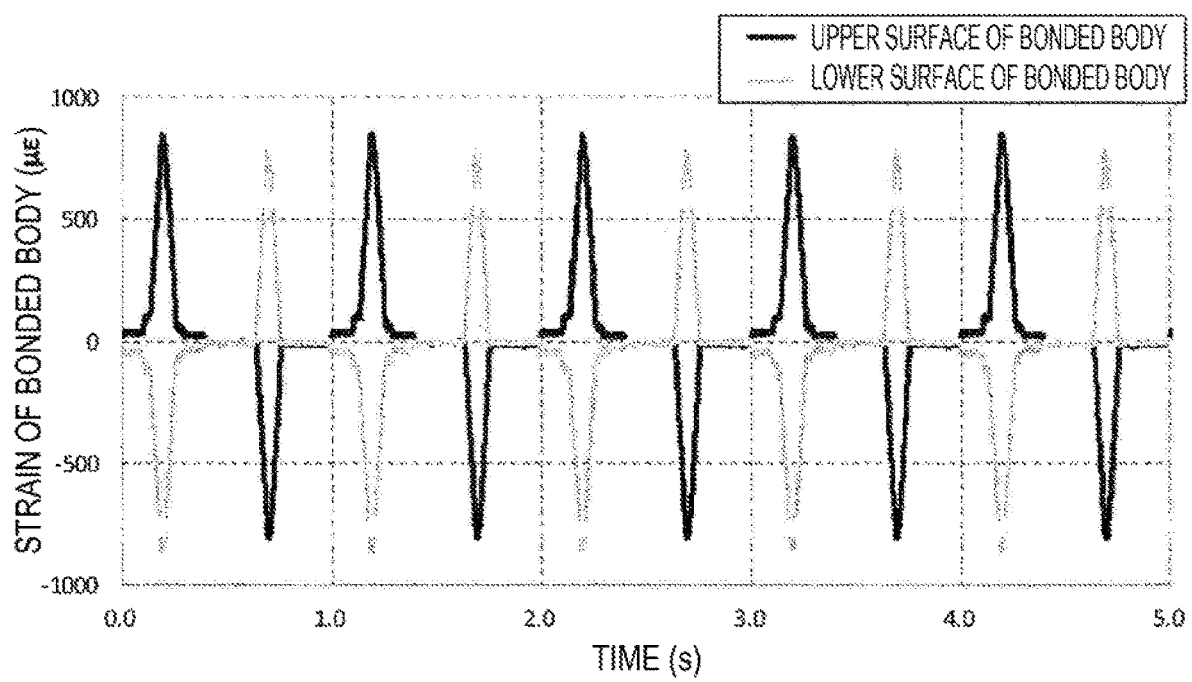
FIG. 14D

EVALUATION POSITION OF STRAIN OF BONDING MATERIAL

STRAIN DISTRIBUTION OF BONDING LAYER
WHEN 0.001 STRAIN OCCURS IN SURFACE OF BONDED BODY

TEST JIG AND TEST METHOD

TECHNICAL FIELD

The present invention relates to a mechanical test jig and a test method for a bonding structure and a bulk material.

BACKGROUND ART

In recent years, the use of machine parts and electric parts is expanding, and various materials are developed for these various uses. To secure reliability of a product when each material is used for various products, it is necessary to grasp the mechanical characteristics and fatigue characteristics of the material. It is generally known that a test piece of a bulk material is prepared and tested as a method for obtaining the mechanical characteristics and the fatigue characteristics of the material. In addition, a method for preparing and testing a bonding test piece for grasping the mechanical characteristics and the fatigue characteristics of the bonding material is also known.

PTL 1 discloses a means "there are provided fixing support parts 2 and 3 supporting corresponding positions of one side 1a and another side 1b of a test piece 1 with an interval L therebetween, two first load points 4a and 4b loaded within the interval L of the fixing support parts 2 and 3 while being separated from the one side 1a of the test piece 1, and two second load points 5a and 5b loaded within the interval L of the fixing support parts 2 and 3 while being separated from the other side 1b of the test piece 1. The test piece 1 is loaded at different positions of the first load points 4a and 4b and the second load points 5a and 5b" in order to solve "a true fatigue strength of a test piece is measured when completely reversed four-point bending test is performed".

PTL 2 discloses a means "a bonding surface of a bonded material 5 (measuring target) is set to a pentagon or a triangle, and the measuring target 5 is bonded with a high-strengthened jig 6 using an adhesive 7, and a four-point bending measurement is performed by a strength test" in order to solve "providing a method for measuring a bonding strength with ease and accuracy when various types of materials, specially brittle materials such as glass and ceramic are bonded".

In PTL 3, there is described "a test device has been used to induce a two-dimensional deformation such as a four-point bending and a three-point bending in a fatigue test caused by a mechanical load in the related art". These test methods are test methods only for the bending in one direction. Therefore, the bending deformation can be generated in the cross section of the test piece perpendicular to a support side, but the bending deformation hardly occurs in the depth direction. However, the deformation may occur three-dimensionally in many cases when a semiconductor device is thermally loaded. Comparing a stress distribution of the test piece in the case of the three-point bending or the four-point bending test of the related art and a stress distribution of the semiconductor device at the time of thermal load, these distributions of solder bonding stress of the corners are not necessarily matched, for example. As a means for the problem, there is disclosed "a mechanical loading test method for a semiconductor device in which a semiconductor device (including a circuit board) 3 or a semiconductor simulating member is bent in plural directions by the mechanical load in a mechanical load bending tester which is configured by a loading portion (deformation causing portion) 10 and a test piece supporting portion 9 so as to induce a three-dimensional deformation".

CITATION LIST

Patent Literature

PTL 1: JP 2013-036878 A
PTL 2: JP 2014-085273 A
PTL 3: JP 2000-097833 A

SUMMARY OF INVENTION

Technical Problem

Some materials desired to acquire mechanical characteristics and fatigue characteristics are difficult to make in a large-size bulk material for a test piece. In addition, in the case of the bonding material, there is a material having different characteristics in the bonding state and a bulk material or a material existing only as a thin bonding layer. Further, in a case where a material having a characteristic that deformation proceeds remarkably in one direction, such as a ratchet deformation and a creep deformation is evaluated, the test piece is deformed in one direction during the test, and thus an appropriate characteristic may be not acquired in a test method where the material is loaded in one direction. An object of the invention is to realize a test which acquires a mechanical characteristic and a fatigue characteristic of various bulk materials and bonding materials.

Solution to Problem

In order to solve the above problem, the invention provides a test jig which includes a primary jig which fixes both sides of a test piece, which is a test object, an upper jig which includes a load portion to load a weight on two places of an upper surface and two places of a lower surface of the primary jig, and a lower jig which includes a load portion to load a weight on two places of the upper surface and two places of the lower surface of the primary jig. The upper surface and the lower surface of the primary jig disposed on both sides of the test piece are on almost the same plane.

Advantageous Effects of Invention

According to the invention, if even a material difficult to be made in a large test piece can be made in a fine test piece, the dimension of the material is suitable to the four-point bending test by fixing both sides to a primary jig. In addition, even in a case where a bonding material having different characteristics in the bonding state and the bulk material, and a bonding material only existing as a thin bonding layer are evaluated, the material evaluation of the bonding state is possible if a fine test piece containing the bonding layer can be created. Further, the upper and lower surfaces of the primary jigs on both sides are on almost the same plane, so that the completely reversed four-point bending test can be performed using the upper and lower jigs. Even in a case where a material having a characteristic that deformation proceeds remarkably in one direction, such as a ratchet deformation and a creep deformation is evaluated, the completely reversed four-point bending load is applied to the test object, so that it is possible to prevent deformation of the test object in one direction during the test.

With these effects, a test for acquiring the mechanical characteristic and the fatigue characteristic can be realized

BRIEF DESCRIPTION OF DRAWINGS

FIGS. 14A to 14D are diagrams illustrating a deformation mode of a test according to the first embodiment of the invention and a temporal variation of strain generated in the bonding test piece (test object).

DESCRIPTION OF EMBODIMENTS

Hereinafter, embodiments will be described using the drawings.

First Embodiment

A first embodiment of the invention will be described using FIGS. 1 to 13.

Figure 1:
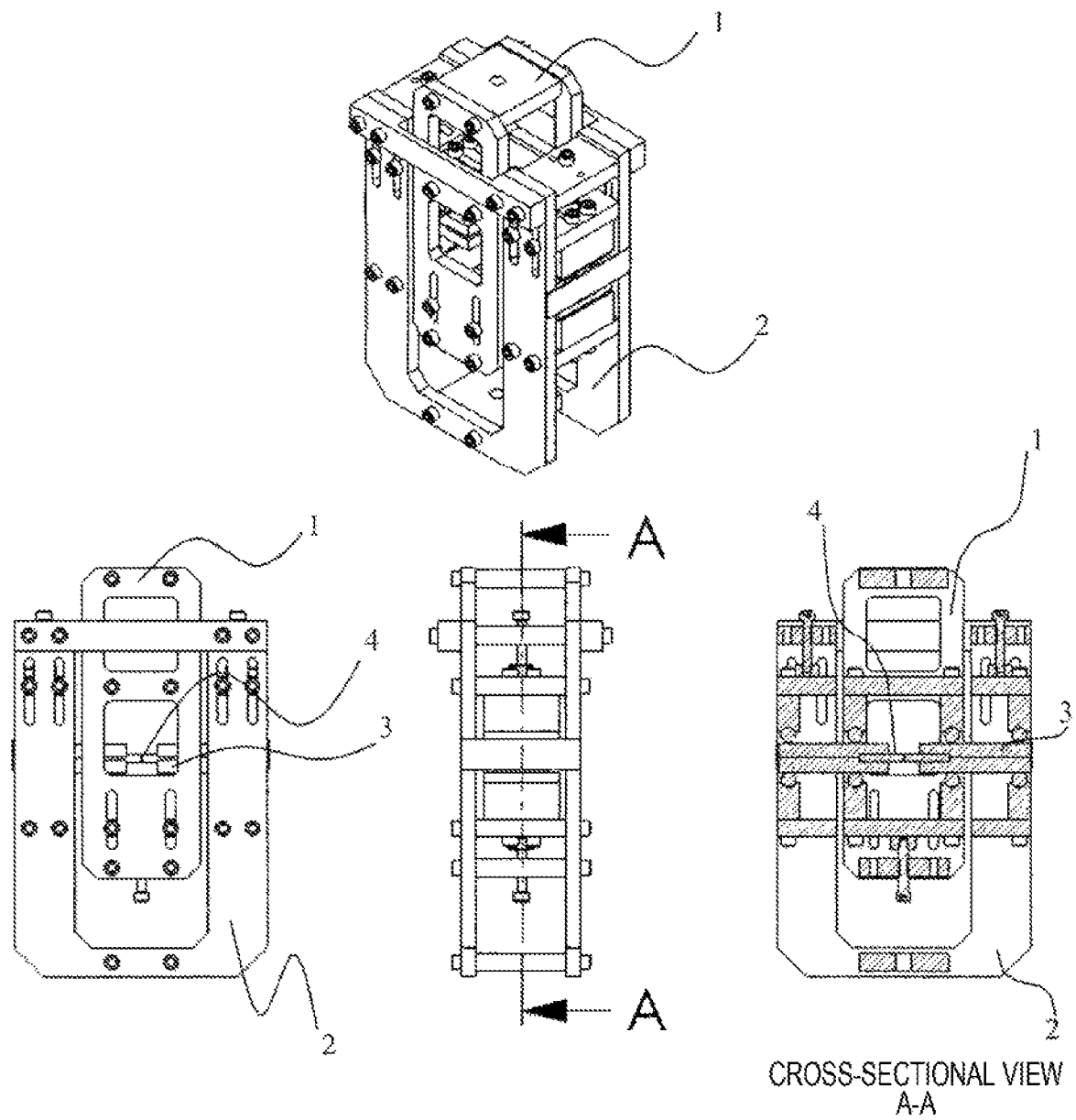
FIG. 1 is a diagram for describing a test jig according to a first embodiment of the invention and a cross-sectional view thereof.

FIG. 1 is a diagram and a cross-sectional view of a test jig according to a first embodiment of the invention.

A primary jig 3 is disposed in both sides of a test piece 4 (test object), and the primary jig 3 and the test piece 4 integrated are set in an upper jig 1 and a lower jig 2. In this embodiment, the description will be given about a test method for testing a mechanical characteristic and a fatigue characteristic of the test piece 4 using the test jig which is configured by the upper jig 1, the lower jig 2, and the positioning jig 3, and a test jig which is used in the method.

Figure 2:
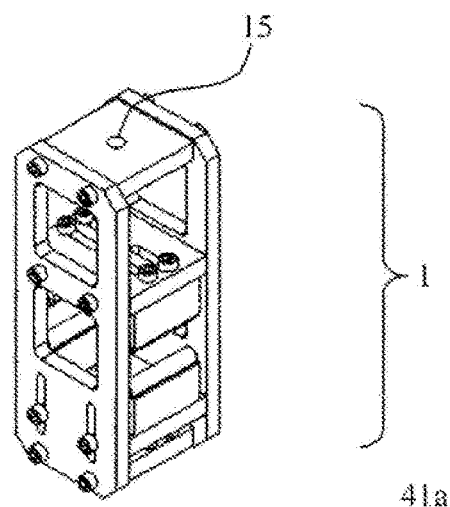
FIG. 2 is a diagram for describing an upper jig of the test jig according to the first embodiment of the invention.
Figure 2:
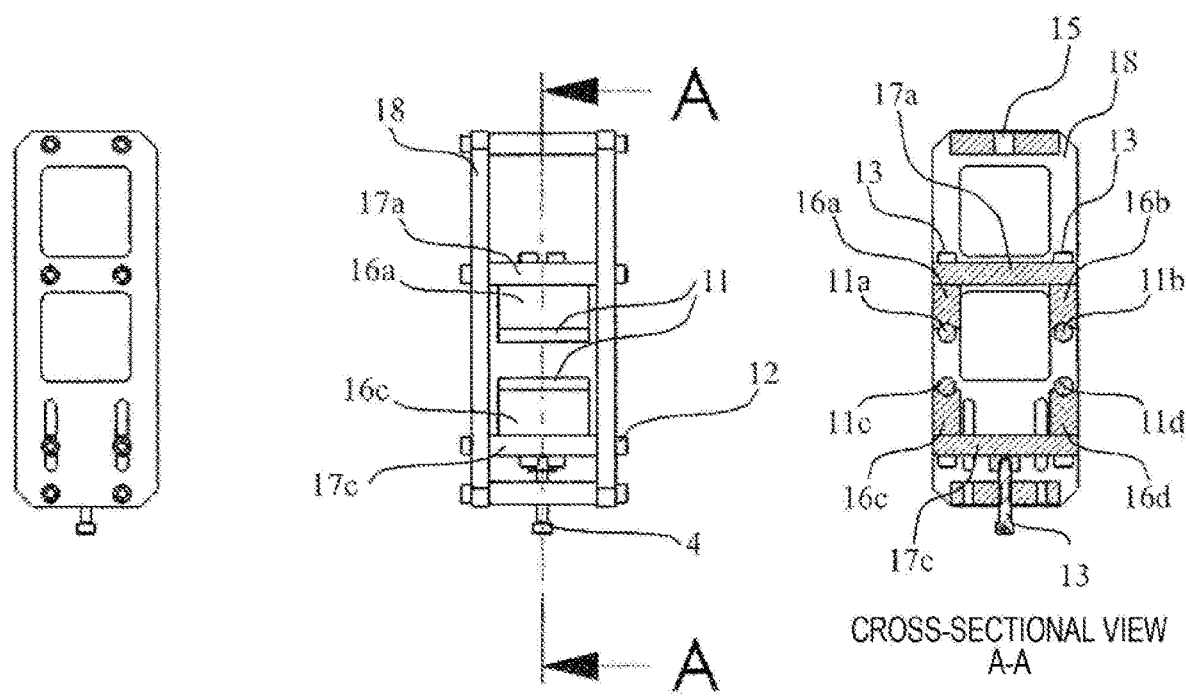

The upper jig 1 will be described in detail using FIG. 2. In the upper jig 1, four-point bending load portions 11 on a cylinder are provided at four places in total (11a to 11d), and the four-point bending load portions 11 are supported by four-point bending load portion supporting bodies 16 (16a to 16d), respectively. The four-point bending load portions 11a and 11b become two inner loading portions when the test object is deformed to be convex downward in a completely reversed four-point bending test. The four-point bending load portions 11c and 11d are two inner loading portions when the test object is deformed to be convex upward in the completely reversed four-point bending test. The four-point bending load portion supporting bodies 16a and 16b which support the four-point bending load portions 11a and 11b are fixed to one supporting body fixing member 17a by a four-point bending load portion span adjusting bolt 13, and fixed to an upper jig frame 18 by a four-point bending load portion vertical adjusting bolt 12. Similarly, the four-point bending load portion supporting bodies 16c and 16d which support the four-point bending load portions 11c and 11d are fixed to one supporting body fixing member 17c by the four-point bending load portion span adjusting bolt 13, and fixed to the upper jig frame 18 by the four-point bending load portion vertical adjusting bolt 12. The four-point bending load portion vertical adjusting bolt 12 and the four-point bending load portion span adjusting bolt 13 are respectively configured to be adjusted in position. The vertical distances of the four-point bending load portions 11a and 11b and the four-point bending load portions 11c and 11d can be adjusted by adjusting the four-point bending load portion vertical adjusting bolt 12. In addition, the inner span at the time of four-point bending can be adjusted by adjusting the four-point bending load portion span adjusting bolt 13. With the functions of adjusting the vertical distances and the span, the jig can handle various types of test conditions. A test device mounting hole 15 is provided in the upper portion of the upper jig frame 18. When performing the test, the upper jig 1 is connected to a test device using the test device mounting hole 15.

Figure 3:
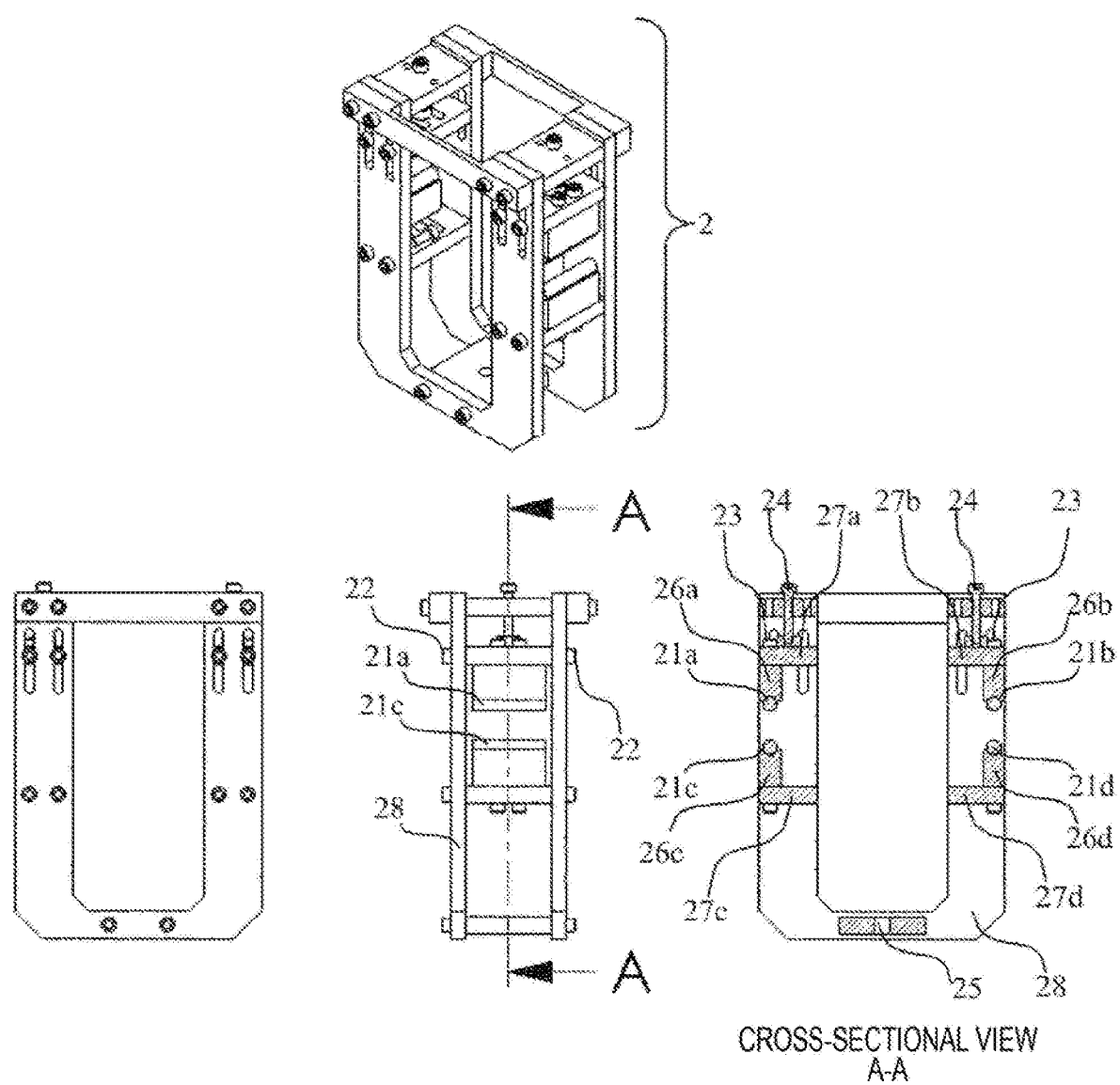
FIG. 3 is a diagram for describing a lower jig of the test jig according to the first embodiment of the invention.

Details of the lower jig 2 will be described in detail using FIG. 3. In the lower jig 2, four-point bending load portions 21 on a cylinder are provided at four places in total (21a to 21d), and the four-point bending load portions 21 are supported by four-point bending load portion supporting bodies (26a to 26d), respectively. The four-point bending load portions 21a and 21b become two outer loading portions when the test object is deformed to be convex upward in a completely reversed four-point bending test. The four-point bending load portions 21c and 21d are two outer loading portions when the test object is deformed to be convex downward in the completely reversed four-point bending test. The four-point bending load portion 21 is supported by the four-point bending load portion supporting body 26. The four-point bending load portion supporting body 26 is fixed to a supporting body fixing member 27 by a four-point bending load portion span adjusting bolt 23, and fixed to an upper jig frame 28 by a four-point bending load portion vertical adjusting bolt 22. The four-point bending load portion vertical adjusting bolt 22 and the four-point bending load portion span adjusting bolt 23 are respectively configured to be adjusted in position. The vertical distances of the four-point bending load portions 21a and 21b and the four-point bending load portions 21c and 21d can be adjusted by adjusting the four-point bending load portion vertical adjusting bolt 22. In addition, the outer span at the time of four-point bending can be adjusted by adjusting the four-point bending load portion span adjusting bolt 23. With the functions of adjusting the vertical distances and the span, the jig can handle various types of test conditions. A test device mounting hole 25 is provided in the lower portion of a lower jig frame 28. When the test is performed, the lower jig 1 is connected to an actuator of the test device using the test device mounting hole 25.

Figure 4:
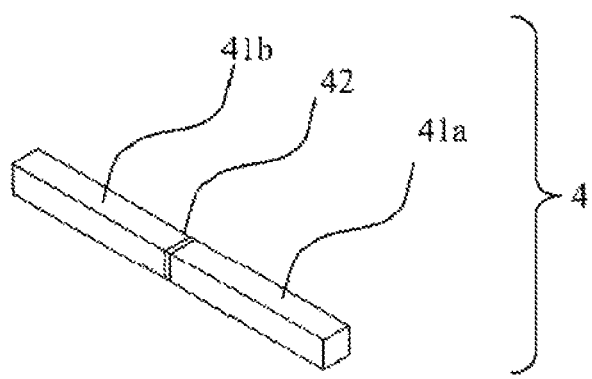
FIG. 4 is a diagram for describing a bonding test piece (test object) in a test according to the first embodiment of the invention.
Figure 4:
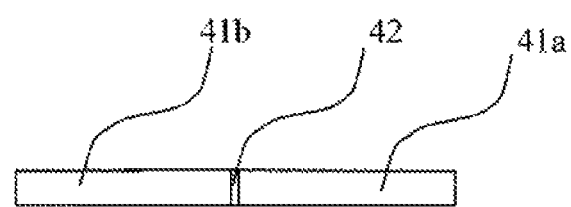
Figure 5A:
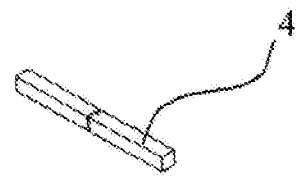
FIGS. 5A to 5D are diagrams for describing a method for assembling the bonding test piece (test object) and a primary jig of the test jig in a test according to the first embodiment of the invention.
Figure 5B:
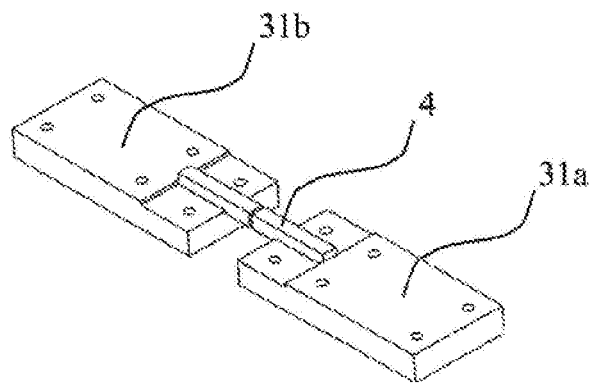
Figure 5C:
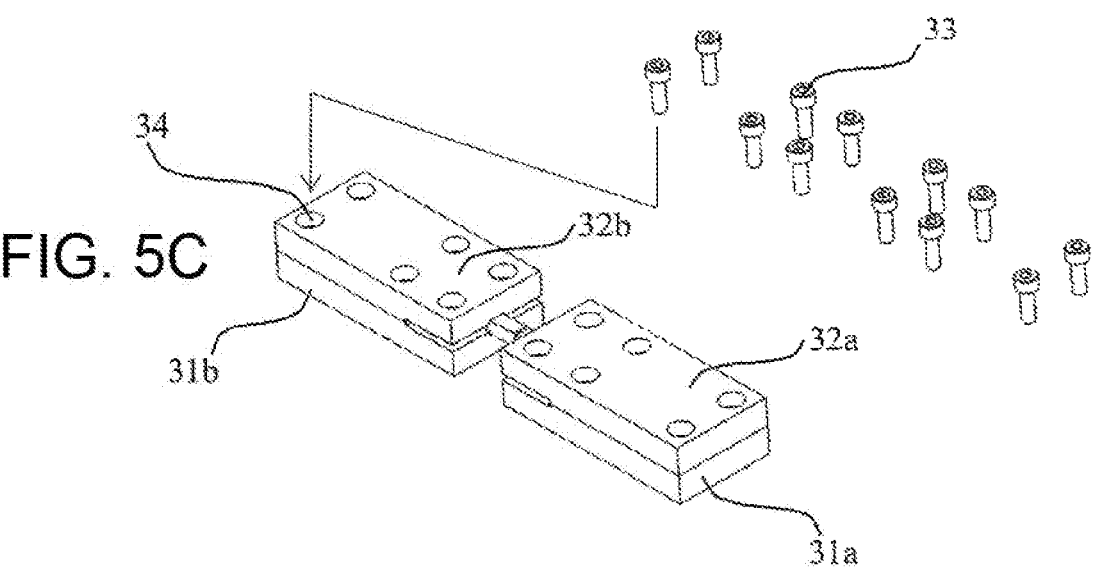
Figure 5D:
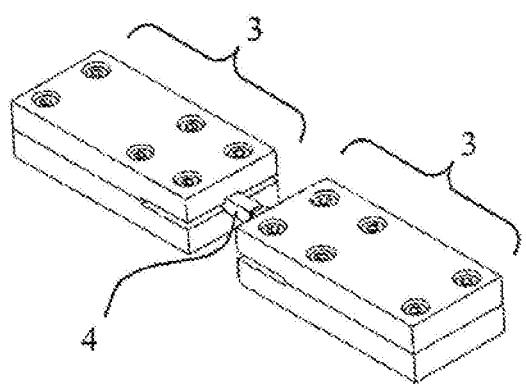

Details of the test piece 4 will be described in detail using FIG. 4. In this embodiment, a mechanical characteristic and a fatigue characteristic of the bonding layer 42 are evaluated using a bonding test piece in which bonded portions 41a and 41b are bonded by a bonding layer 42. In this embodiment, a solder material containing nickel of a 5×5×30 mm square column is used for the bonded portions 41a and 41b, and a solder material of a 5×5×0.1 mm square column containing tin as a main component is used for the bonding layer 42 to be evaluated. The solder material of the bonding layer 42 is interposed between the bonded portions 41a and 41b in a sheet shape. The solder material is heated more than a melting point of the solder material. The nickel of the bonded portion 41 and the solder material react to each other and bonded to create the test piece 4. At this time, the bonding layer 42 is disposed in a surface orthogonal to a longitudinal direction of the test piece 4.

In a case where the mechanical characteristic of the bonding layer 42 is evaluated by the four-point bending test, a bending moment is generated not only in the bonding layer 42 but also in the bonded portion 41. If not only an elastically-deformed linear region but also a plastically-deformed non-linear region of the mechanical characteristic of the bonding layer 42 are evaluated, when both the bonding layer 42 and the bonded portion 41 show a non-linear behavior according to the bending moment, both the bonding layer 42 and the bonded portion 41 need to be separated, and thus it is difficult to make an evaluation with accuracy. Therefore, it is desirable that there is no non-linear behavior of the bonded portion 41, or the non-linear behavior is sufficiently small compared to the non-linear behavior of the bonding layer 42. Therefore, it is desirable that the material of the bonded portion 41 has a yield stress larger than the material of the bonding layer 42. Even in a case where a fatigue test is performed, if the evaluation is performed in a non-linear deformation range such as a low cycle fatigue strength, it is desirable that there is no non-linear behavior of the bonded portion 41, or the non-linear behavior is sufficiently small compared to the non-linear behavior of the bonding layer 42. Therefore, even in this case, it is desirable that the material of the bonded portion 41 has a yield stress larger than the material of the bonding layer 42. In this embodiment, the bonding layer 42 to be evaluated is a solder material containing tin as a main component, and thus nickel having a large yield stress compared to the solder material is used for the bonded portion 41. Other materials such as metal having a large yield stress may be used for the bonded portion 41. However, there is a need to secure the strength of the bounding interface to the bonding layer 42. Therefore, in a case where metal is used for the bonded portion 41, the surface is desirably coated with nickel.

When the bonding layer 42 is evaluated by the four-point test, the bending moment is loaded evenly to the bulk portion of the bonding layer 42 and to the bonding interface between the bonding layer 42 and the bonded portion 41. Therefore, in the fatigue test, the cross surface with the shortest lifespan in the bulk portion of the bonding layer 42 and the bonding interface between the bonding layer 42 and the bonded portion is broken, so that the weakest portion of the entire bonding portion can be evaluated.

Figure 6:
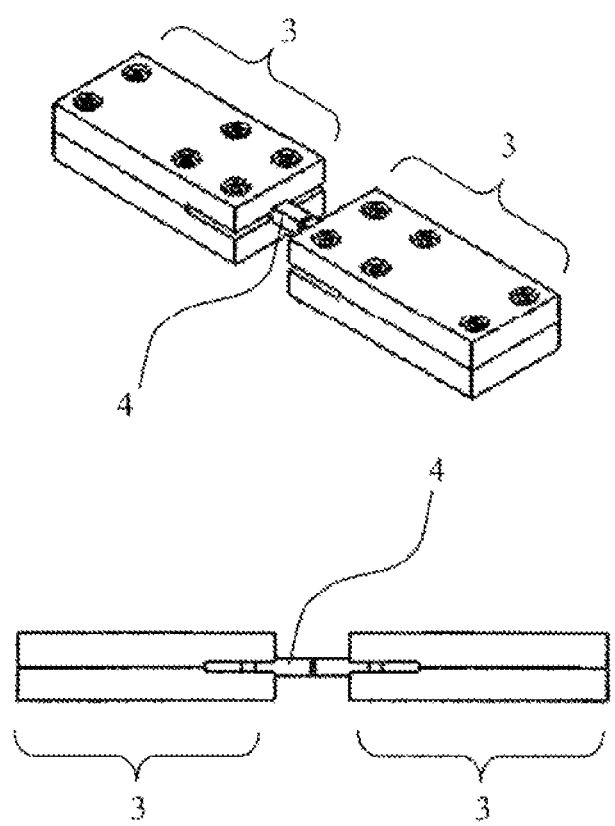
FIG. 6 is a diagram for describing a state where the bonding test piece (test object) is fixed with the primary jig in a test according to the first embodiment of the invention.

A procedure of fixing the test piece 4 to the primary jig 3 will be described using FIG. 5. The test piece 4 is disposed in grooves of lower sides 31a and 31b of the primary jig 3. At this time, the bonding layer 42 to be evaluated is disposed to be exposed between the lower sides 31a and 31b of the primary jig 3. Next, lower sides 32a and 32b of the primary jig 3 are disposed on the lower sides 31a and 31b of the primary jig 3, and both sides of the test piece 4 are interposed with the upper and lower surfaces of the primary jig 3. Finally, the upper and lower surfaces of the primary jig 3 are fastened by the fastening bolt 33 to fix the primary jig 3 and the test piece 4. At this time, a spot-faced hole 34 for bolt is provided in an upper side 32 of the primary jig 3. The upper portion of the fastening bolt 33 is not exposed from the upper surface of the upper side 32 of the primary jig after fastening the fastening bolt 33. Therefore, as illustrated in FIG. 6, there is no projection in the upper and lower surfaces of the primary jig 3 on both sides of the test piece 4 after fixing the test piece 4. The upper and lower surfaces become almost flush with each other. When the test is performed, the test piece 4 is caused to be bent by loading a weight on four points of the upper and lower surfaces of the primary jig 3.

In the four-point bending test, a bending moment M generated in the inside span of the test object is expressed by Expression (1).

$$M = F(L1 - L2)/4 \qquad (1)$$

Herein, F represents a total load to be applied, L1 represents an outside span, and L2 represents an inside span.

In a case where the test object is small, a difference between L1 and L2 is not increased. Therefore, there is a need to increase a load F to generate a required moment. However, if F is increased, a contact stress of a supporting place is increased. There is a concern that the test piece is broken at the contact portion. If a curvature of the supporting member is increased, the contact stress is decreased. In that case, however, the span is changed according to the bending deformation of the test object. With this regard, in the invention, the dimension of the test object can be made suitably using the primary jig even in a case where the dimension of the test piece is small. Therefore, the four-point bending test can be performed suitably.

The dimension of the primary jig 3 is larger in both a thickness and a width compared to the test piece 4. A flexural rigidity is proportional to the width, and to a cube of the thickness. Therefore, the primary jig 3 has a flexural rigidity sufficiently large compared to the test piece 4. Therefore, in a case where a bending load is applied to this structure, most deformation is caused by the test piece 4, and the material characteristic of the test piece 4 can be acquired with accuracy.

Figure 7:
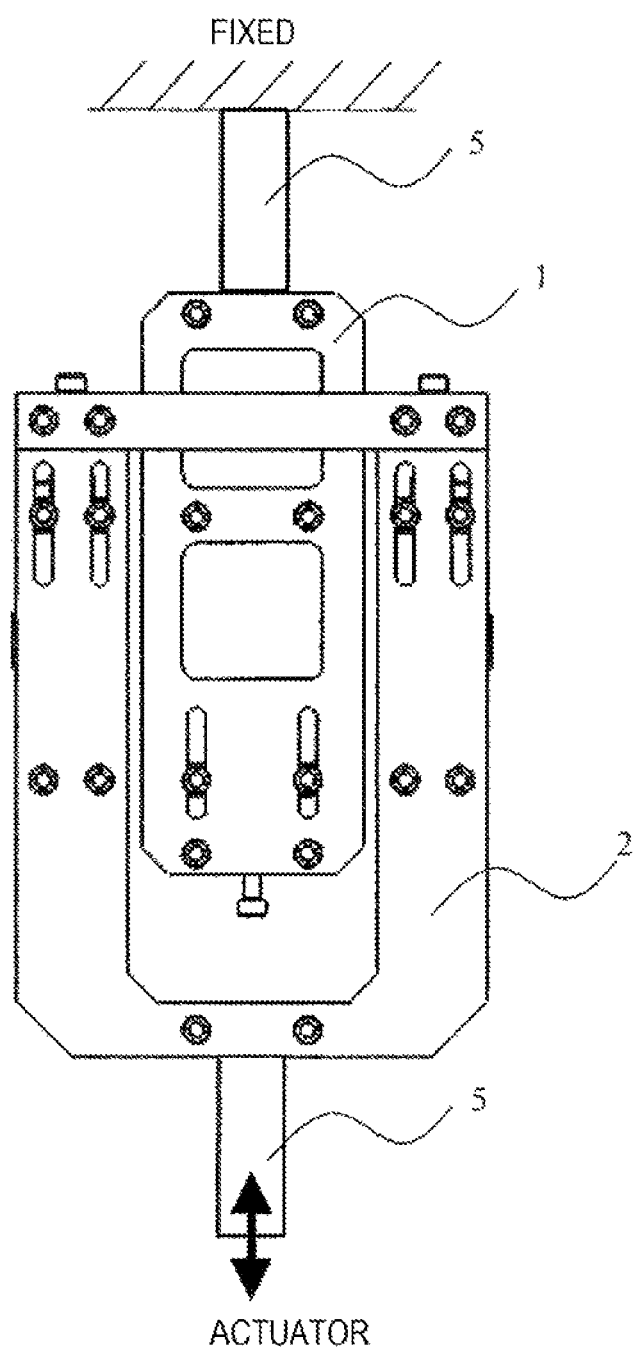
FIG. 7 is a diagram for describing a state where the upper and lower jigs of a test jig are assembled and placed in a test device in a test according to the first embodiment of the invention.

FIG. 7 illustrates a state where the upper jig 1 and the lower jig 2 of the test jig according to the first embodiment of the invention are provided in a tester. The upper surface of the upper jig 1 is connected and fixed to the tester 5, and the lower surface of the lower jig 2 is connected to the actuator of the tester 5. When the actuator of the tester 5 operates up and down, a vertical positional relation of the upper jig 1 and the lower jig 2 is changed, and the bending test is enabled.

Figure 8:
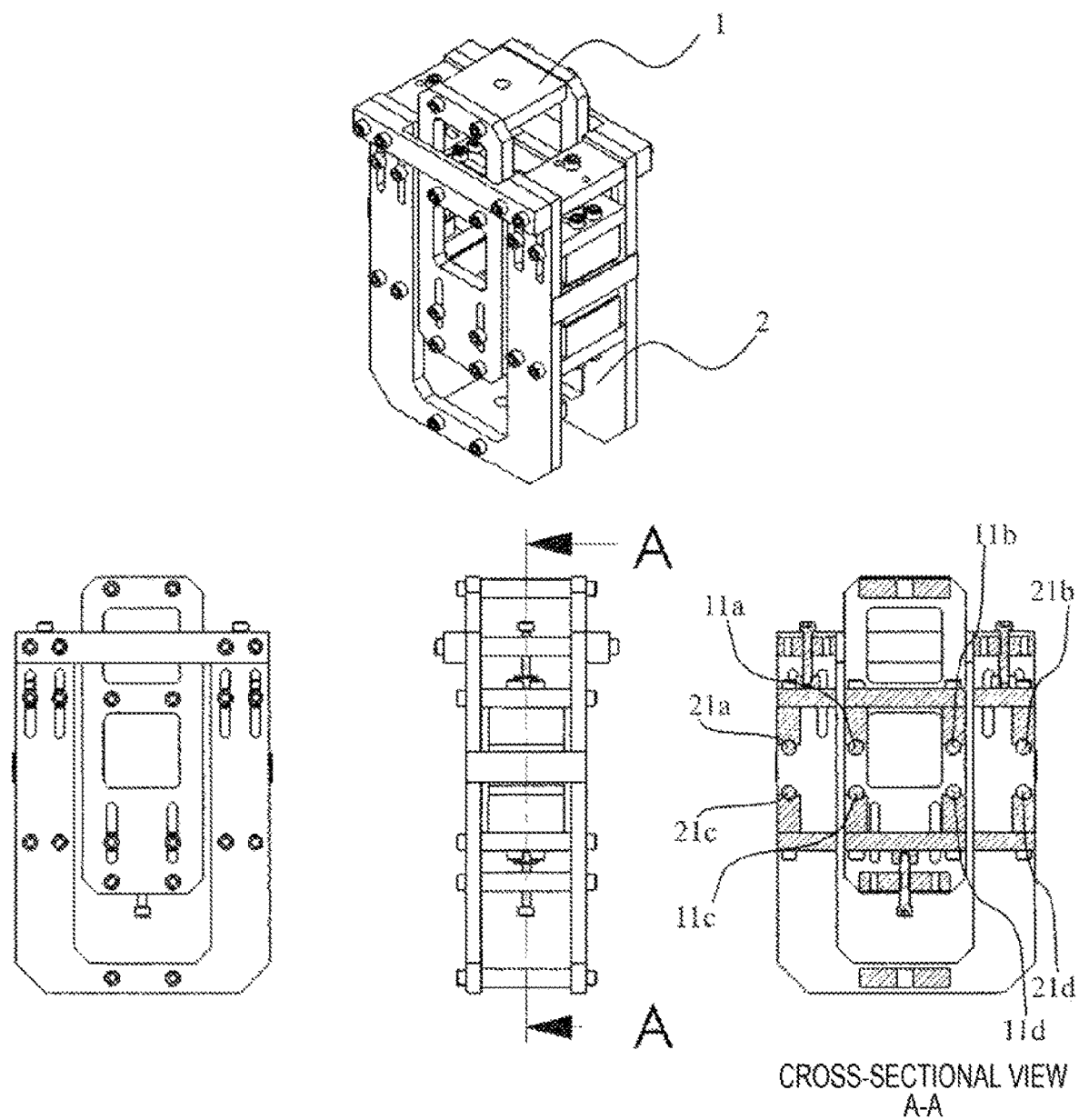
FIG. 8 is a diagram for describing a state where the upper and lower jigs of the test jig are assembled in a test according to the first embodiment of the invention.

In FIG. 8, an example of the positional relation between the upper jig 1 and the lower jig 2 in a state where the upper jig 1 and the lower jig 2 illustrated in FIG. 7 are disposed in the tester is illustrated in a cross-sectional view. The four-point bending load portions 11a and 11b of the upper jig and the four-point bending load portions 21a and 21b of the lower jig become almost flush with each other. In addition, the four-point bending load portions 11c and 11d of the upper jig and the four-point bending load portions 21c and 21d of the lower jig become almost flush with each other.

Figure 9:
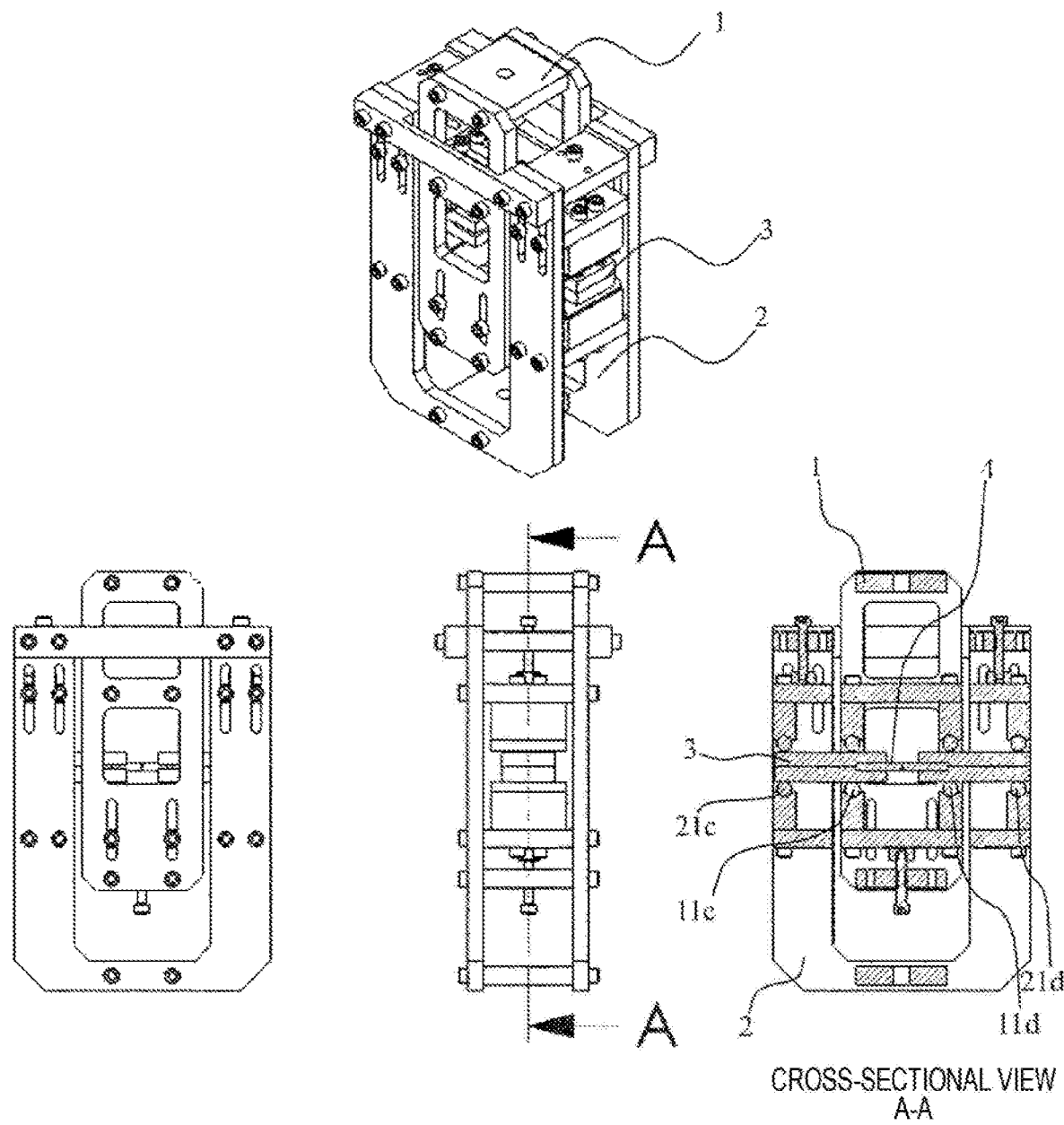
FIG. 9 is a diagram for describing a state where the bonding test piece (test object) is fixed with the primary jig and the upper and lower jigs are assembled in a test according to the first embodiment of the invention.

When the test is performed, first the primary jig 3 fixed with the test piece 4 as illustrated in FIG. 9 is disposed to the upper jig 1 and the lower jig 2 of the positional relation illustrated in FIG. 8. Since there is no projection such as a bolt in the upper and lower surfaces of the primary jig 3, a feature that the primary jig 3 can be inserted from the side surface of the upper jig 1 or the lower jig 2, which is also the feature of the test jig of the invention. With the feature that the primary jig 3 can be inserted or extracted through the side surface of the upper jig 1 or the lower jig 2, the primary jig can be taken out to replace the test piece without disassembling the upper jig and the lower jig. Therefore, when the test of a plurality of test pieces is performed, there is no need to disassemble the upper jig 1 and the lower jig 2 every time when the test is performed. Therefore, an interval between tests can be shortened.

Figure 10:
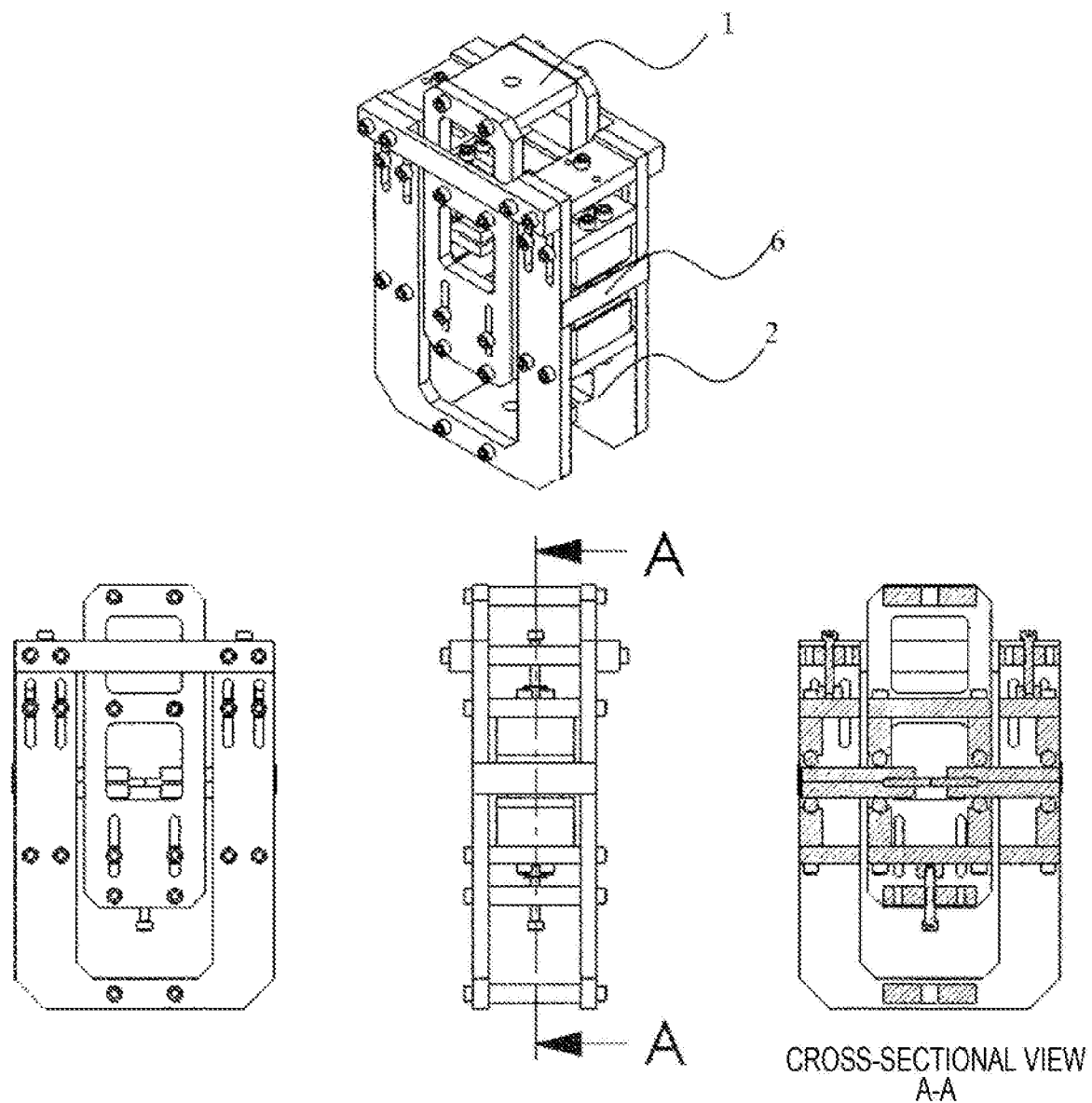
FIG. 10 is a diagram for describing a state where a pressing member is installed to prevent a positional deviation at the time of test in the state of FIG. 9 in a test according to the first embodiment of the invention.
Figure 11:
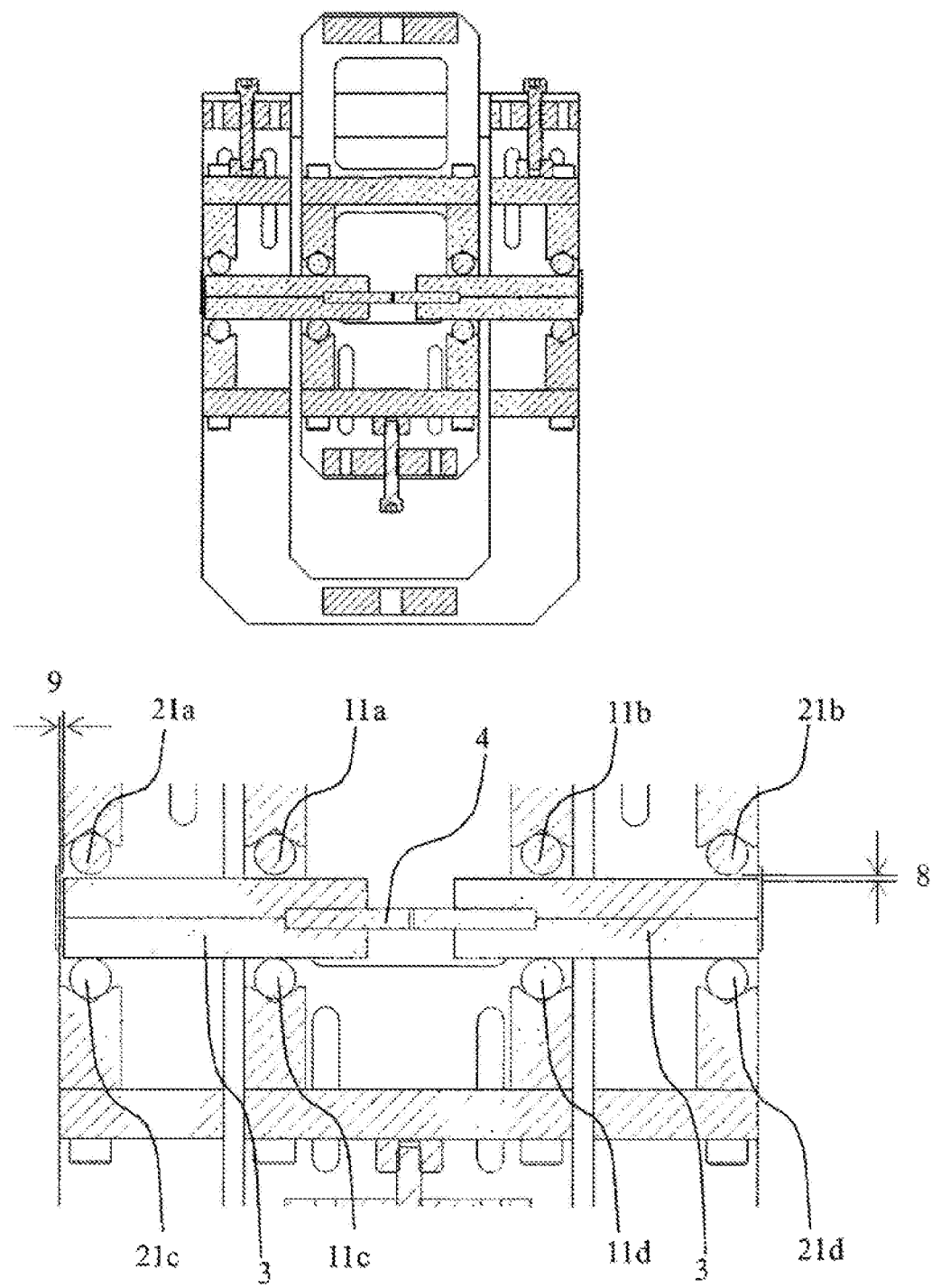
FIG. 11 is a diagram for describing a gap provided between the upper and lower jigs and a positioning jig in a test according to the first embodiment of the invention.

If the primary jig 3 is provided, the lower surface of the primary jig 3 is supported by four places of the four-point bending load portions 11c, 11d, 21c, and 21d. On the other hand, a gap is provided without bringing the upper surface of the upper jig into contact with the four-point bending load portions 11a, 11b, 21a, and 21b. Next, as illustrated in FIG. 10, it is possible to prevent the primary jig 3 from moving in the horizontal direction by disposing a pressing member 6 on both side surfaces of the lower jig 2. FIG. 11 illustrates an enlarged surrounding view the primary jig 3. A fine gap 8 is provided in the vertical direction, and a fine gap 9 is provided in the horizontal direction. Therefore, it is possible to prevent restriction other than the four-point load while preventing the positional deviation between the test piece 4 and the primary jig 3 at the time of bending test.

Figure 12A:
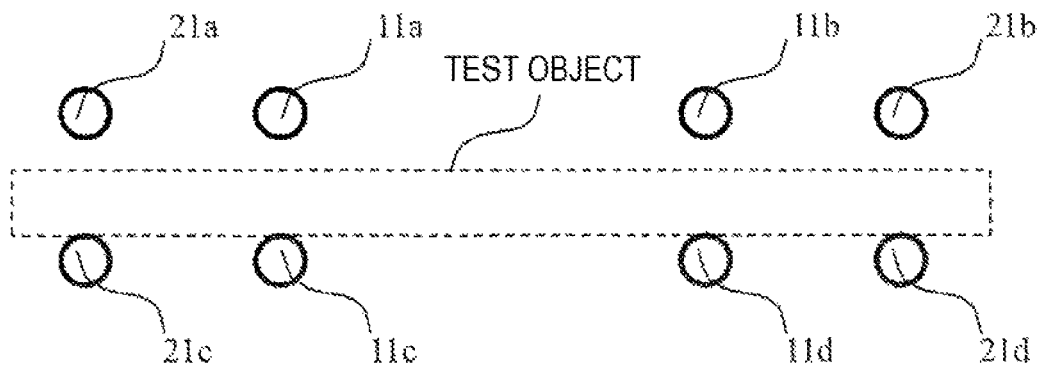
FIGS. 12A to 12C are diagrams for describing a method for a completely reversed four-point bending test in a test according to the first embodiment of the invention.
Figure 12B:
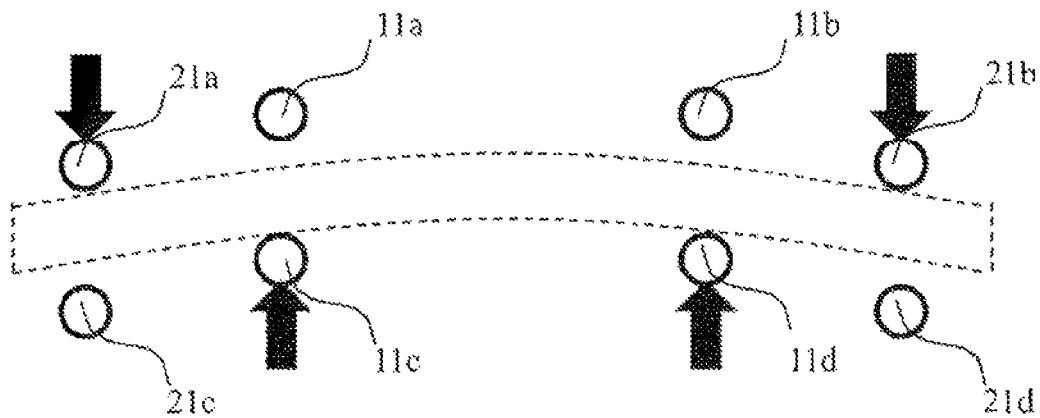
Figure 12C:
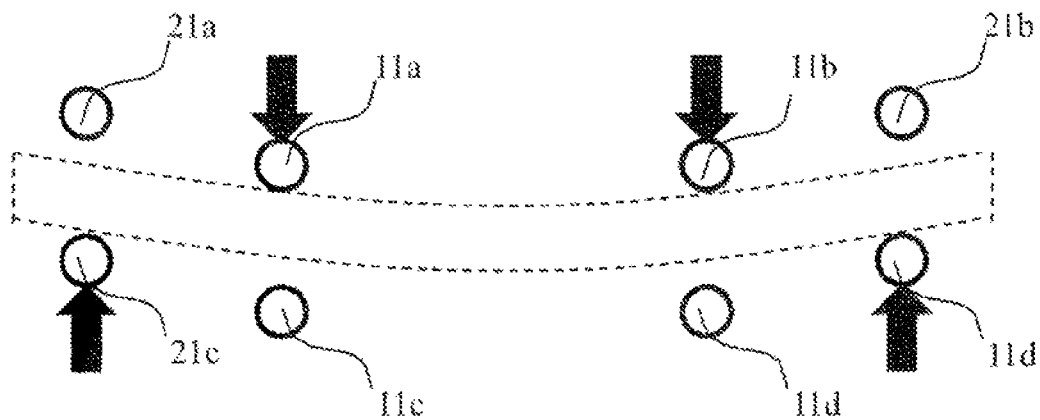

FIG. 12 schematically illustrates the bending load during the test. A state before the test is illustrated in FIG. 12(a). In this state, the weight of the test piece 4 and the primary jig 3 is supported only by four places of the four-point bending load portions 11c, 11d, 21c, and 21d, and bending load is not generated in the test object. FIG. 12(b) illustrates a state where the upper jig 1 is moved up by the actuator of the tester 5. At this time, the four-point bending load portions 11a to 11d of the upper jig 1 move up. Therefore, a four-point bending deformation occurs in which an upward weight is generated in the four-point bending load portions 11c and 11d of the upper jig 1, a downward weight is generated in the four-point bending load portions 21a and 21b of the lower jig 2, and the test object interposed by these portions is deformed to be convex upward. FIG. 12(c) illustrates a state where the upper jig 1 is moved in the lower direction by the actuator of the tester 5. At this time, the four-point bending load portions 11a to 11d of the upper jig 1 move down. Therefore, a four-point bending deformation occurs in which a downward weight is generated in the four-point bending load portions 11a and 11b of the upper jig 1, an upward weight is generated in the four-point bending load portions 21c and 21d of the lower jig 2, and the test object interposed by these portions is deformed to be convex downward. Therefore, the states of FIGS. 12(b) and 12(c) can be repeated by repeatedly moving the lower jig 2 up and down by the tester so as to realize the completely reversed four-point bending test.

Further, in a case where the vertical gap 8 illustrated in FIG. 11 is not provided, the four-point bending load is not applied onto the test object as illustrated in FIG. 12(b) even if the lower jig 2 is moved up. A shearing load is applied to a region surrounded by the four-point bending load portions 21a, 21c, 11c, and 11a and a region surrounded by the four-point bending load portions 11b, 11d, 21d, and 21b, that is, a shearing test. Therefore, it is important to provide the gap 8.

Figure 13A:
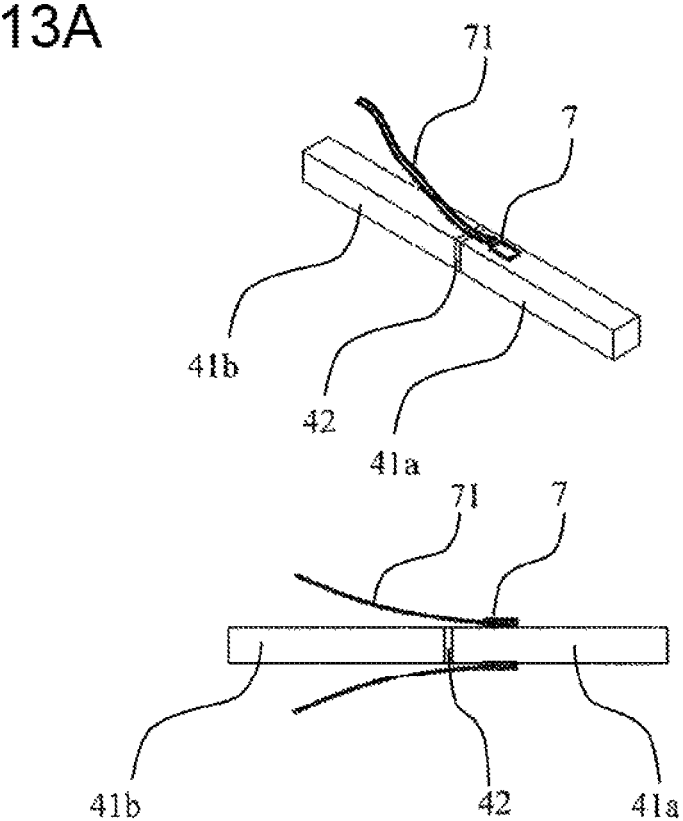
FIGS. 13A and 13B are diagrams for describing a state where a strain gauge for measuring strain is installed in the bonding test piece (test object) in a test according to the first embodiment of the invention.
Figure 13B:
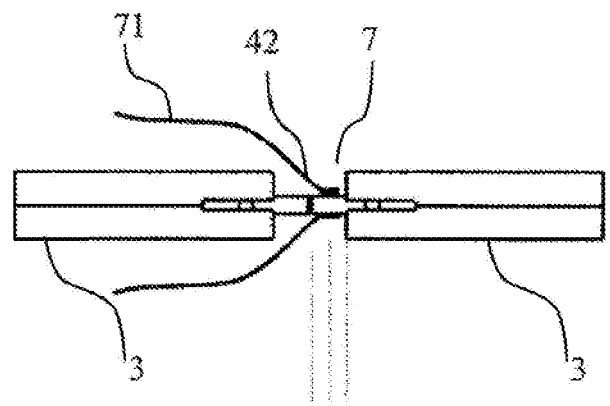

In the test using the test jig according to the first embodiment of the invention, the values of the weight and the displacement detected by the tester 5 can be acquired. The amount of the bending moment loaded on the test piece 4 and the displacement can be obtained from the values. Further, as illustrated in FIG. 13, a strain gauge is provided in the bonded portion 41 of the test piece 4 to measure strain. Therefore, it is possible to acquire data excluding an influence such as a backlash caused by the inside of the tester 5 and the jig, and the amount of the bending moment loaded on the test piece 4 can be measured with higher accuracy. At this time, it is effective to provide the strain gauge on the upper surface, the lower surface, or both upper and lower surfaces of the bonded portion 41 where the strain is maximized by the bending deformation in order to grasp the bending deformation of the bonded portion 41 with high accuracy. When the strain gauge is provided in the upper and lower surfaces of the bonded portion 41, it is considered that a deviation in strain distribution is caused by a rigidity difference with respect to the bonded portion 41 at a position near the primary jig 3 and the bonding layer 42. Therefore, the strain gauge is desirably installed at almost the center between the end of the bonding layer 42 and the end of the primary jig 3. In addition, a strain gauge line 71 to acquire a signal from a strain gauge 7 is led to a side near the bonding layer 42, so that it is possible to prevent the strain gauge line 71 from interfering when the test piece 4 is fixed to the primary jig 3. If the strain of the bonded portion 41 can be acquired, the bending moment loaded on the test piece 4 can be obtained, and the strain generated in the bonding layer (evaluation target) can be calculated. Further, in a case where the thickness of the bonding layer 42 is large, the strain of the bonding layer 42 can be directly acquired by directly providing the strain gauge in the bonding layer 42.

FIG. 14 illustrates an example of a temporal variation of the strain of a bonded body which is acquired in the test using the test jig according to the first embodiment of the invention. The graph shows a temporal variation of strain acquired by the strain gauge provided in the upper and lower surfaces of the bonded body in a test where the upwardly convex deformation illustrated in (a) in the drawing, (b) no load, (c) the downwardly convex deformation, and (b) no load are repeatedly performed. The test is performed on a condition of 1 Hz. When a positive strain is generated in the upper surface of the bonded body, a negative strain is generated almost symmetrically in the lower surface. When a negative strain is generated in the upper surface of the bonded body, a positive strain is generated almost symmetrically in the lower surface. From this temporal variation, it is confirmed that the bonded body is repeatedly deformed to both up and down sides by the completely reversed four-point bending load. In addition, when the positive/negative strains of the upper and lower surfaces are reversed, there is a time when the strains of the upper and lower surfaces become 0. This time is an idle running time which is generated when the vertical gap 8 is provided. In this way, the idle running time and the bending strain repeating in a vertically symmetric manner are features of the test result using the test jig according to the first embodiment of the invention.

Figure 15:
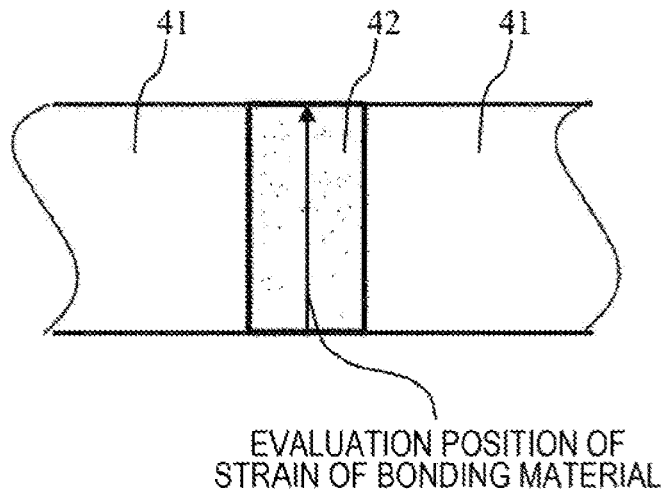
FIG. 15 is a diagram illustrating a result of a finite element analysis method which shows an influence of a bonding thickness in a test on a bonding material of the invention.
Figure 15:
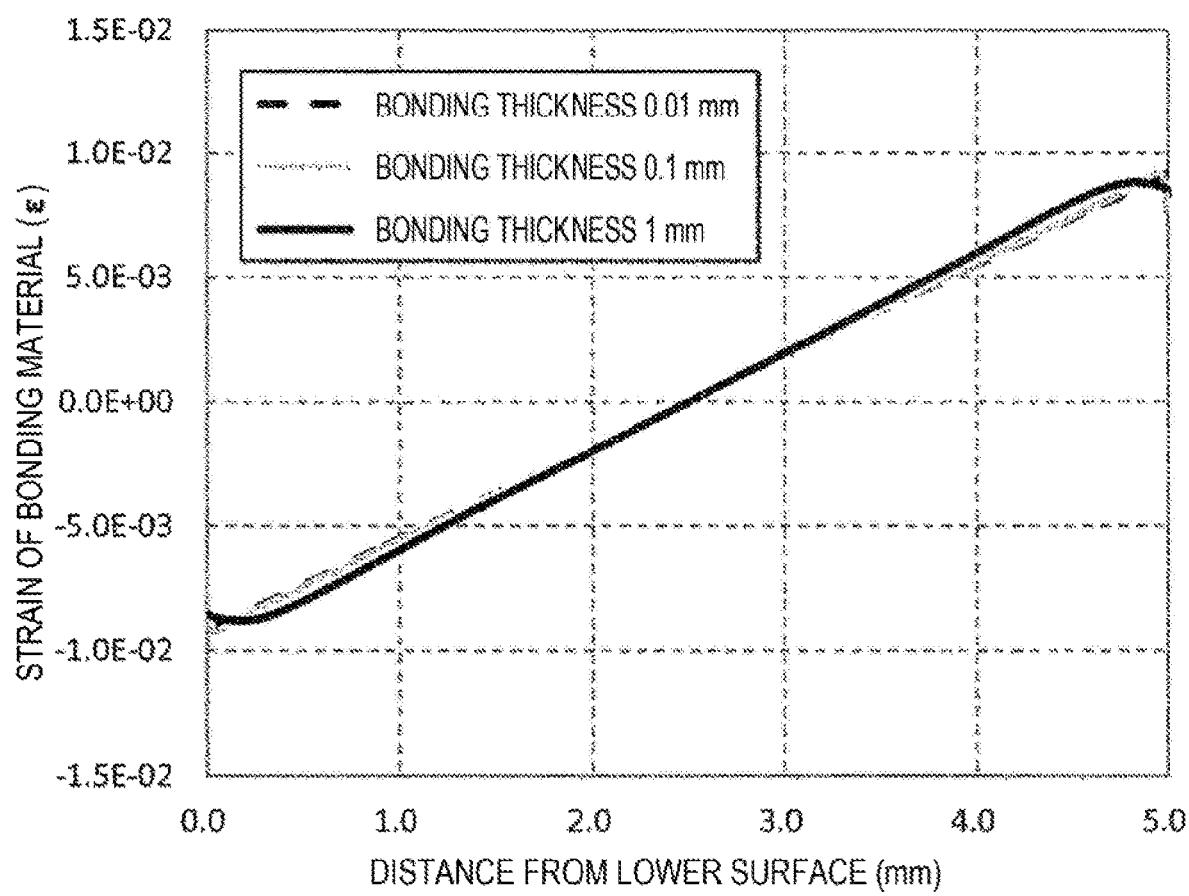
Figure 16A:
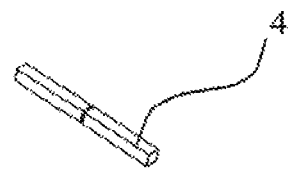
FIGS. 16A to 16D are diagrams for describing the bonding test piece (test object) and the primary jig in a test according to a second embodiment of the invention.
Figure 16B:
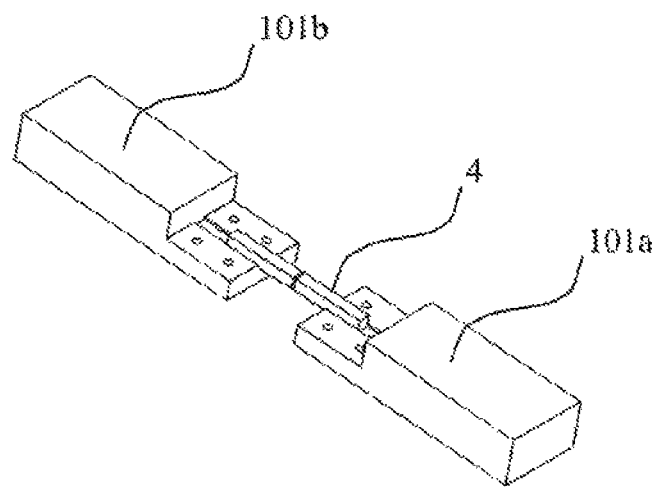
Figure 16C:
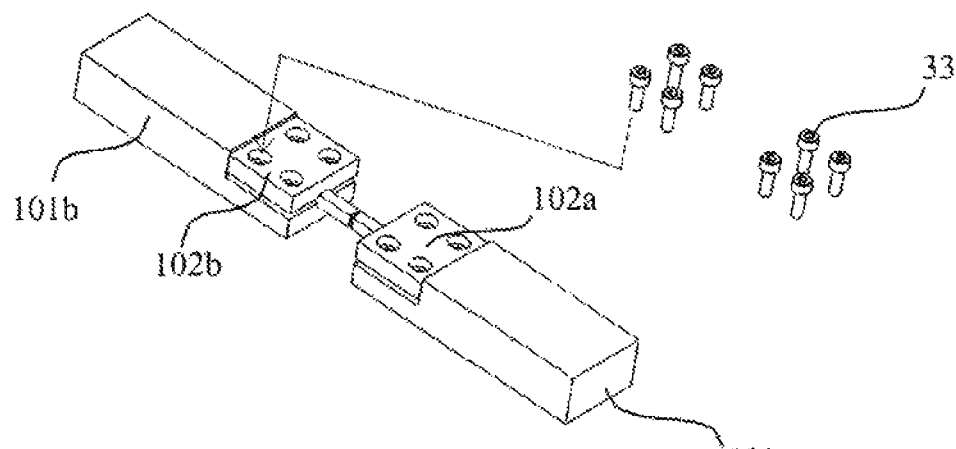
Figure 16D:
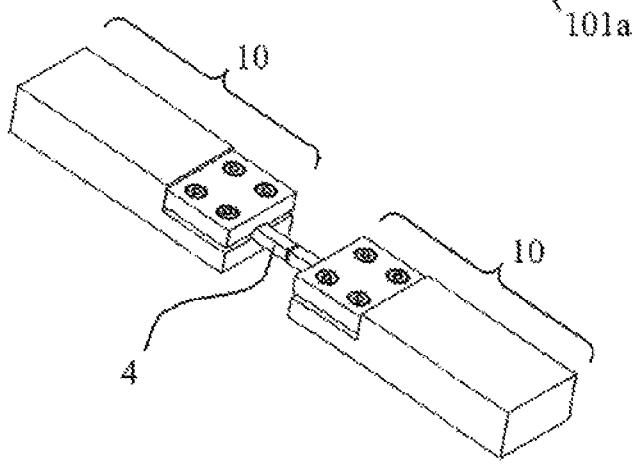

In the test using the test jig according to the first embodiment of the invention, an even bending moment can be loaded on the test piece 4. Therefore, if the bending strain generated in the bonded body 41 is the same, the same bending moment can be loaded on the bonding layer 42 regardless of the thickness of the bonding layer 42. FIG. 15 illustrates a strain distribution which is generated in the bonding layer 42 when 0.001 strain is generated in the surface of the bonded body using a finite element analysis method. The longitudinal elastic moduli of the bonded material and the bonding layer are set to 200 and 20 GPa, respectively. The strain of the bonding layer 42 is evaluated at the center in the thickness direction as illustrated in the drawing. As a result of evaluation on conditions of three different orders of the bonding layer having the thickness of 0.01, 0.1, and 1 mm, it is confirmed that the strain of the bonding layer 42 does not depend on the thickness of the bonding layer. Currently, various types of bonding materials are developed, and the bonding thicknesses are also varied. The test of the invention can be performed on any bonding thickness in a unified manner. Further, even a test piece of unknown bonding thickness can be evaluated.

Second Embodiment

FIG. 16 illustrates a primary jig 10 of the test jig according to a second embodiment of the invention and a procedure of fixing the test piece 4 with the primary jig 10. This embodiment is different from the first embodiment in that a lower side 101 of the primary jig 10 is larger than an upper side 102, and the test piece 4 is fixed by part of the lower side 101 and the upper side 102 while plane dimensions of the lower side 31 and the upper side 32 of the primary jig 3 are almost the same, and the test piece 4 is fixed by overlapping these upper and lower sides in the first embodiment. In this embodiment, the thickness of the primary jig 10 is determined by the thickness of the lower side 101. The thickness caused by the bolt fastening when the test piece 4 is fixed does not change. Therefore, even in a case where the test piece 4 is replaced, the thickness of the primary jig 10 is constant, the vertical gap 8 when being assembled to the upper jig 1 and the lower jig 2 becomes constant, and the test can be performed with more stability. However, the dimension of the primary jig becomes large compared to the first embodiment. In accordance with these features, embodiments can be differently used depending on the test piece, the test condition, etc.

Third Embodiment

Figure 17:
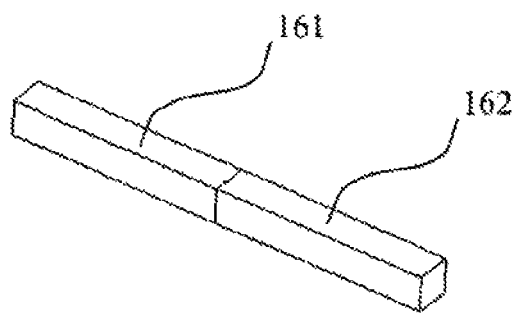
FIG. 17 is a diagram for describing the bonding test piece (test object) in a test according to a third embodiment of the invention.

FIG. 17 illustrates the shape of the test piece according to a third embodiment of the invention. This embodiment is different from the first embodiment in that the test piece 4 is not provided with the bonding layer but configured by two members 161 and 162 while the test piece 4 is configured by the bonded portion 41 and the bonding layer 42 in the first embodiment. This embodiment can be utilized in a case where a bonding interface is cut from a bonding portion where a foreign material is bonded without the bonding material by a bonding method such as a solid diffusion bonding or from a large-scale bonding portion, and evaluated. As described using FIG. 15, the evaluation can be made without depending on the thickness of the bonding layer in the test of the invention. Even in a case where there is no bonding layer as in this embodiment, the bonding interface is loaded with a well-known bending moment, so that the evaluation can be made in an unified manner similarly to a case where the bonding layer is provided.

Fourth Embodiment

Figure 18:
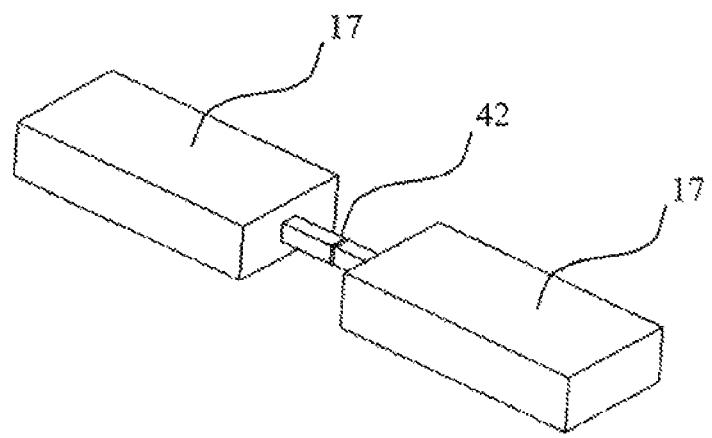
FIG. 18 is a diagram for describing the bonding test piece (test object) in a test according to a fourth embodiment of the invention.

FIG. 18 illustrates the shape of the test piece according to a fourth embodiment of the invention. This embodiment is different from the first embodiment in that a bonded portion 17 of the test piece 4 serves also the function of the primary jig 3 while the dimension of the test object is expanded by fixing the test piece 4 and the primary jig 3 to enable the four-point bending test in the first embodiment. This embodiment can be utilized in a case where a material of a large dimension is used in the bonded portion 17 through the bonding method for the bonding layer 42. In this embodiment, the test piece serves also as the primary jig 3, so that there is no need to separately prepare the primary jig 3. On the other hand, the dimension of the test piece becomes large. In accordance with these features, embodiments can be differently used.

Fifth Embodiment

Figure 19:
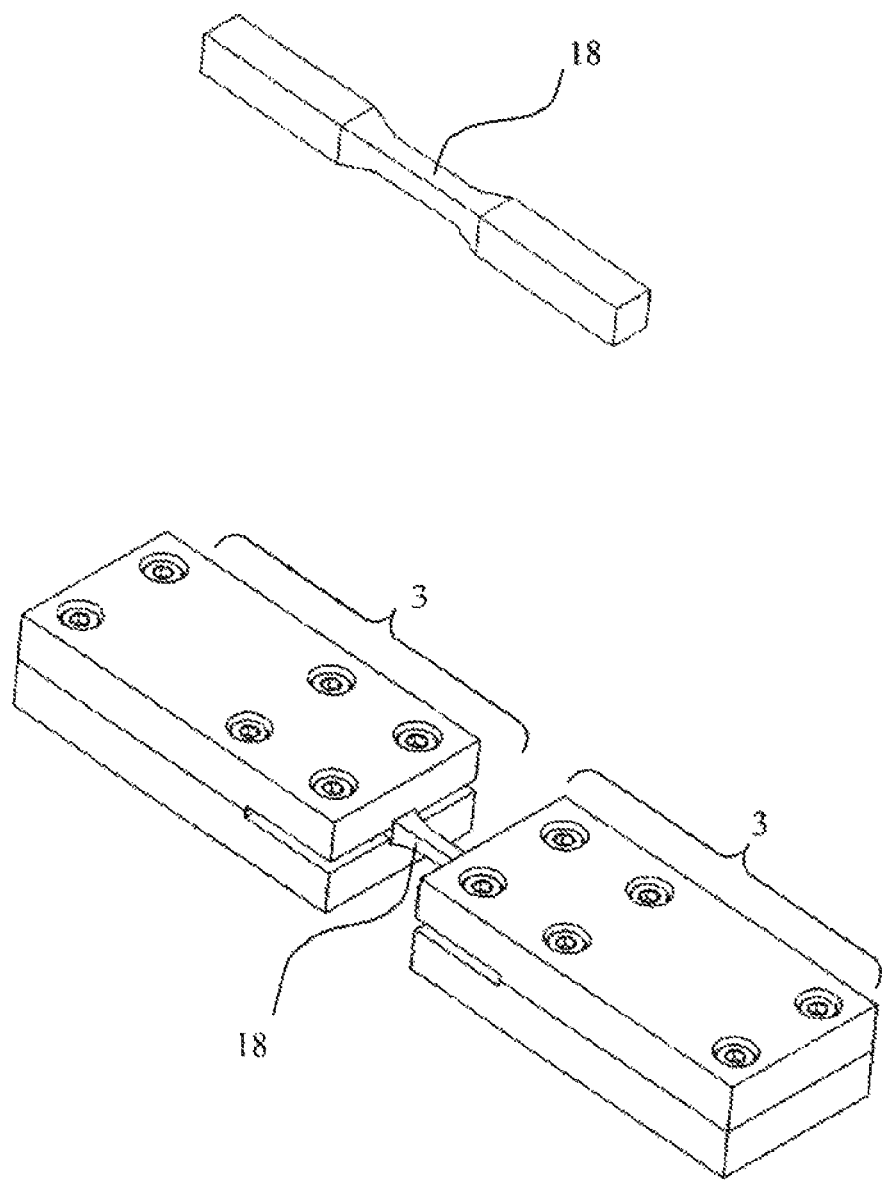
FIG. 19 is a diagram for describing a bulk test piece (test object) and the primary jig in a test according to a fifth embodiment of the invention.

FIG. 19 illustrates the shape of the test piece according to a fifth embodiment of the invention.

This embodiment is different from the first embodiment in that the evaluation of a bulk material is a target while the evaluation containing a bonding portion is a target in the first embodiment. Therefore, a test piece 18 does not have a bonding layer and a bonding portion. Even in the case of this test piece, similarly to the first embodiment, the test can be performed similarly to the other embodiments by fixing the test piece 18 to the primary jig 3. In a case where a bulk material is evaluated, it is effective that the dimension of the center of the test piece 18 is set to be smaller than that of the fixing portion in order to prevent the fixing portion between the test piece 18 and the primary jig 3 from being broken, so that the flexural rigidity is lowered. At this time, if the thickness is set to small, the flexural rigidity becomes effective at the third power. If the width is set to small, the flexural rigidity is effectively linear. The shape of the test piece may be selected according to the shape of the test piece which can be prepared, the purpose of the test, etc.

Further, even in the first to fourth embodiments, in a case where the strength of the bonding layer 42 and the bonding interface and the strength of the bonded portion 41 is small, it is effective that the cross-sectional dimension of the bonding portion is small similarly to this embodiment.

Hitherto, the invention has been specifically described on the basis of the embodiments. However, the invention is not limited to the above embodiments, and various changes can be made in a scope nor departing from the spirit.

REFERENCE SIGNS LIST 1 upper jig
11 upper jig (four-point bending load portion)
12 upper jig (four-point bending load portion vertical adjusting bolt)
13 upper jig (four-point bending load portion span adjusting bolt)
14 upper jig (weight support bolt)
15 upper jig (test device mounting hole)
16 upper jig (four-point bending load portion supporting body)
17 upper jig (supporting body fixing member)
18 upper jig (upper jig frame)
2 lower jig
21 lower jig (four-point bending load portion)
22 lower jig (four-point bending load portion vertical adjusting bolt)
23 lower jig (four-point bending load portion span adjusting bolt)
24 lower jig (weight support bolt)
25 lower jig (test device mounting hole)
16 lower jig (four-point bending load portion supporting body)
17 lower jig (supporting body fixing member)
18 lower jig (lower jig frame)
3 primary jig
31a, 31b primary jig (lower)
32a, 32b primary jig (upper)
33 fastening bolt
34 spot-faced hole for fastening bolt
4 test piece
41a, 41b bonding test piece (bonded portion)
42 bonding test piece (bonding layer)
5 tester
6 pressing member
7 strain gauge
71 strain gauge line
8 vertical gap
9 horizontal gap
10 primary jig
101a, 101b primary jig (lower)
102a, 102b primary jig (upper)
161, 162 bonding material and bonded member
17 bonded member
18 bulk test piece

The invention claimed is:

1. A test jig, comprising:
a primary jig which fixes both sides of a test piece, the test piece being a test object; an upper jig which includes a load portion to load a weight on two places of an upper surface and two places of a lower surface of the primary jig; and a lower jig which includes a load portion to load a weight on two places of the upper surface and two places of the lower surface of the primary jig,
wherein the upper surface and the lower surface of the primary jig disposed on both sides of the test piece are on almost the same flat surface.

2. The test jig according to claim 1,
wherein a distance in a thickness direction of the primary jig between the load portion loading on the upper surface of the primary jig of the upper jig and the load portion loading a weight on the lower surface is larger than a thickness of the primary jig, and wherein a distance in a thickness direction of the primary jig between the load portion loading on the upper surface of the primary jig of the lower jig and the load portion loading a weight on the lower surface is larger than the thickness of the primary jig.

3. The test jig according to claim 1,
wherein a thickness and a width of the primary jig are equal to or larger than a thickness and a width of the test piece.

4. The test piece used in a test using the test jig according to claim 1,
wherein the test piece is a bonding structure in which a plurality of bonded portions are bonded, and bonding surfaces are provided in a direction perpendicular to a longitudinal direction of the test piece.

5. The test piece for testing according to claim 4,
wherein a yield stress of any bonded portion is larger than a yield stress of a bonding layer which bonds the bonded portion.

6. A four-point bending test method using the upper jig, the lower jig, and the primary jig which are the test jig according to claim 1, comprising:
fixing the upper jig and the lower jig to a fixing portion and an actuator of a test device; matching a loading portion of the upper jig and a loading portion of the lower jig to be almost the same height; inserting the primary jig fixed with the test piece from side surfaces of the upper jig and the lower jig; and applying a bending load to the test piece by moving the upper jig or the lower jig vertically by an actuator of the test device.

7. The test method according to claim 6,
wherein a strain gauge is provided in a substantially center between an end of a bonding layer of an upper surface, a lower surface, or both surfaces of the bonded portion of the test piece and an end of a primary jig 3, and a completely reversed bending moment loaded on the test piece is obtained using a value of strain acquired by the strain gauge, and a strain generated in the bonding layer is calculated on the basis of the obtained bending moment.

* * * * *